Jan. 11, 1966         B. W. HOWK ETAL         3,228,746
       METHOD OF TREATING EXHAUST GASES OF INTERNAL
                   COMBUSTION ENGINES
Filed Sept. 29, 1960                     2 Sheets-Sheet 1

INVENTORS
ALVIN B. STILES
BENJAMIN W. HOWK

BY *Albert B. Griggs*
              ATTORNEY

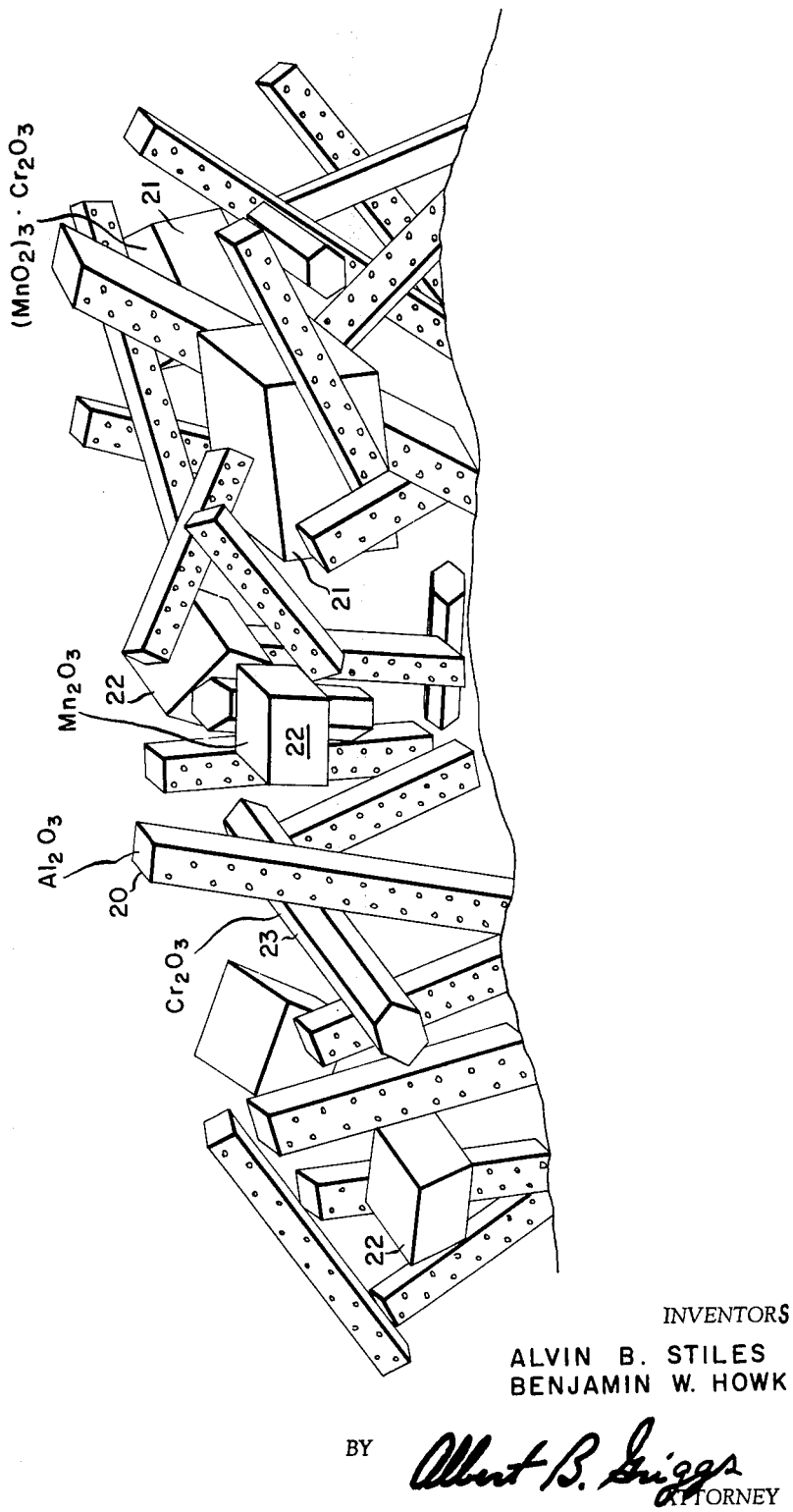

3,228,746
METHOD OF TREATING EXHAUST GASES OF INTERNAL COMBUSTION ENGINES
Benjamin W. Howk, West Chester, Pa., and Alvin B. Stiles, Charleston, W. Va., assignors to E. I. du Pont de Nemours and Company, Wilmington, Del., a corporation of Delaware
Filed Sept. 29, 1960, Ser. No. 59,263
4 Claims. (Cl. 23—2)

This application is a continuation-in-part of our U.S. application Serial No. 828,778, filed July 22, 1959, and now abandoned.

This invention relates to the treatment of automobile exhaust gases to effect catalytic conversion of components thereof and is more particularly directed to processes, devices, and catalysts employing manganese chromite for the treatment of automobile exhaust gases.

In the drawings:

FIGURE 4 is an artist's conception of the mode of association of crystallites with a support in a preferred catalyst of the invention.

Figure 1:
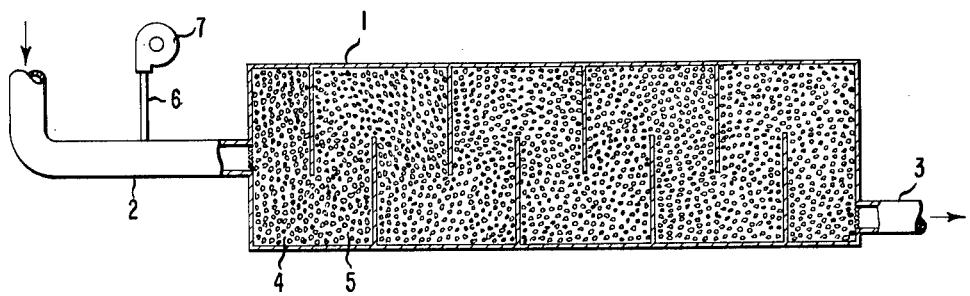
FIGURE 1 illustrates a catalytic muffler of the invention.

When gasoline, diesel fuels, and similar hydrocarbons, and other alkane and olefin fuels are burned the combustion is usually incomplete. The waste gases include carbon monoxide, saturated and unsaturated hydrocarbons, nitrogen oxides, sulfur compounds, and the like.

Intensive efforts have been made to solve the problem of abating these products of incomplete combustion with but very limited success. The disposal of waste gases from automotive vehicles is particularly difficult.

According to the present invention the nitrogen oxides in automobile exhaust gases can be reduced and the oxidizable components such as carbon monoxide and hydrocarbons can be oxidized employing managanese chromite as a catalyst as will be further described hereinafter.

The manganese chromite employed can be prepared as shown in Lazier U.S. Patent 746,782 and 1,964,001 and in Wortz U.S. Patent 2,108,156. In these and other prior suggestions of manganese chromites it is proposed that equimolecular amounts of the manganese compound and the chromium compound be used which in aqueous solutions results in a product having a ratio of Mn:Cr of 3:2 because a third of the chromium is not precipitated and is washed away. The exact ratio of the manganese to chromium can be slightly varied for the purposes of the present invention and can go as high as Mn:Cr 3:3 which is the ratio that would exist were one to make a product with equimolar amounts. A novel process will be shown hereinafter according to which this result can be accomplished. Accordingly the term "manganese chromite" will be used simply for purposes of description in the present application to describe products having an Mn:Cr ratio of 3:2 to 3:3 even though the term has actually not been so applied in the prior literature.

The manganese chromites are preferably prepared in aqueous media by a reaction of a water-soluble manganese salt and a water-soluble chromium compound, preferably chromic acid anhydride.

The manganese salts can be such compounds as manganese chloride, manganese nitrate, manganese acetate, manganese sulfate and in general any salt of manganese. The chromium compounds can be such compounds as chromium nitrate, chromium sulfate, chromic acid, ammonium chromate, and ammonium dichromate.

The manganese salt and the chromium salt are used in proportions to give the desired ratios as above described.

If ammonia or another precipitant is to be used which forms water-soluble chromates it will be evident that the water-soluble compounds of chromium, if in the hexavalent state, should not be used in excess of stoichiometric amount which will react with the manganese salt for where ammonia, or the like, is added later it will form a water-soluble ammonium chromate. If it is desired to obtain ratios higher than stoichiometric, these can be obtained by subsequent addition of appropriate chromium compounds.

When the soluble compounds of manganese and chromium are brought together in aqueous solution they, of course, form a precipitate after sufficient ammonia has been added to react with the anions present. Other precipitants can be used such as ammonium chromate and ammoniacal ammonium chromate. However, ammonium hydroxide is inexpensive and is quite effective and is ordinarily satisfactory. The ammonia can readily be eliminated from the product by heating.

The manganese chromite catalyst employed according to the invention can be prepared in other ways and one process which can be used for making products having a higher Mn:Cr ratio than 3:2 is by making a mixture of salts of the manganese and chromium in the desired ratio and in a very finely divided form and calcining. Any of the compounds above mentioned can be used. Thus manganese chloride, manganese nitrate, manganese acetate, manganese sulfate, and other manganese salts can be used. Similarly chromium nitrate, chromium sulfate, chromic acid, ammonium chromate, and ammonium dichromate can be used. Additionally, manganese oxides, including common ores such as pyrolusite, can be used with the various chromium salts mentioned and manganese carbonate and manganese oxalate. In addition to the chromium compounds shown, one can of course use other salts or ores such as chromium sesquioxide, $Cr_2O_3$, chromylchloride, chromylnitrate, and other such chromium compounds.

Preferred catalysts of the invention contain a second catalyst in addition to the manganese chromite. This can be any catalyst or mixture which has value in treating the gases converted according to the invention such as lead chromate, magnesium chromate, barium chromate, and strontium chromate. It is preferred to use base metal catalysts which are base metal chromites of copper, nickel, iron, zinc, cadmium, cobalt, tin, bismuth.

A co-catalyst can be selected from those shown in Lazier U.S. Patent 1,964,001 and the combination of manganese chromite with the co-catalyst can be prepared as generally there described. However, it is suggested in the patent that the chromite mixture be heated to temperature to make a mixed oxide-chromite product at temperatures in excess of 600° C. and this will result in sintering and reduction of catalytic efficiency. This aspect of the teachings of the patent should not be followed in making preferred catalysts of the present invention.

The base metal catalyst chromites are prepared in the same general manner as above described for manganese chromites. Thus a water-soluble salt of one of the base metals as above mentioned is dissolved in the same solution with the manganese and chromium compounds as originally described and coprecipitated with them. The soluble salts can be the chlorides, sulfates, acetates, or nitrates of any of the base metals mentioned. Again, the amount of the chromium compound dissolved should of course be adequate to produce a proper ratio with the base metal. This should be a stoichiometric amount.

The precipitants mentioned above for precipitating manganese chromite, such as ammonia, can at the same time effect coprecipitation of the base metal catalyst.

Instead of being coprecipitated with the manganese chromite, the base metal precipitate can be separately formed by use of a stoichiometric amount of the chromium compound and precipitation as with ammonium hydroxide or anhydrous ammonia. The two slurries thus formed can be brought together or the precipitates separately prepared can be dried, calcined and thereafter mixed. This latter, however, is not a preferred practice.

As will be illustrated hereinafter another preferred procedure is to add the co-catalyst as a heat decomposable salt or compound which can be fused together with or following the fusion of the manganese chromite as previously described.

The proportions of chromite to the base metal catalyst can be widely varied. Generally the ratio of manganese to base metal should range from about 0.5:1 to 10:1 or even higher.

If the manganese chromite and the co-catalyst are prepared by precipitation the precipitation should be effected from a comparatively dilute solution. Ordinarily there should be used about one molar concentration, with respect to the water, of the manganese salt, the chromium compound, the copper compound, and other materials to be coprecipitated. If much higher concentrations are used there is a tendency to favor the production of larger crystallites. Dilute solutions are also valuable because occlusion of impurities is minimized.

It will be understood that while the crystals are formed in the particle sizes desired, they precipitate as aggregates and agglomerates of loosely associated crystallites which can be separated from water as by filtration, centrifugation, or decantation.

While reference has been made above primarily to the use of co-catalysts which are coprecipitated chromates, it will be understood that catalytic metals can be added to the manganese chromite catalyst systems of the invention in various forms. Thus they can be added as the oxides, carbonates, acetates, oxalates, or in any other form in which they have catalytic activity or can develop catalytic activity upon calcination. Thus compounds such as the following can be used as precipitates which are formed separately though in every instance it is preferable that they be in a particle size range such that the crystallite size is as described herein: copper oxide, nickel oxide, iron oxide, zinc oxide, cadmium oxide, tin oxide, bismuth oxide, manganese oxide or dioxide.

As just noted above, the corresponding hydroxides, etc., can be used.

Catalysts prepared as above described can be pelleted and used in such form but it is much preferred according to the present invention that they be supported upon a refractory body coated with the manganese chromite and if one is used, a co-catalyst. As will be illustrated hereinafter it is much preferred that the manganese chromite be precipitated in the presence of the refractory body and it can be formed in situ by heating heat decomposable compounds on the surface of the refractory.

Suitable refractory bodies to be used as supports according to the present invention are:

(1) Porous ceramic spheres, tablets, or rings which have a softening or melting point in excess of 1200° C.
(2) Etched nickel, Nichrome, and Inconel wire
(3) Alundum
(4) Pumice
(5) Diaspore
(6) Bauxite
(7) Periclase
(8) Zirconia
(9) Titania
(10) Diatomaceous earth
(11) Calcium sulfate
(12) Barium oxide
(13) Calcium oxide
(14) Activated alumina granules The catalysts can also be applied to such a carrier or support by applying fusible compounds of the manganese, chromium, co-catalyst, and interspersant and fusing as generally above described.

The amount of manganese chromite to employ on the carrier can be widely varied but it is most efficient to use only the amount required to form a uniform, thin coating. Ordinarily this will run from about 2% to about 20% by weight of manganese chromite based upon the weight of the carrier.

Preferred catalysts of the invention are those which are given increased stability and activity by reason of a unique co-operation between the crystallites in the catalyst aggregate and certain types of supporting materials as illustrated in FIGURE 4 of the drawings.

In FIGURE 4 there is shown an alumina support of high surface area which, as is well known, carries upon its surface a myriad of alumina crystallites illustrated in the figure at 20.

Manganese chromite is illustrated at 21 as a cube lodged among the randomly disposed crystallites 20. Unreacted manganese oxide which may be present in small amount is shown at 22. This is for the most part comparatively remote from unreacted chromic oxide hexagonal crystallites illustrated at 23 because of the geography of the surface. When manganese chromite, manganese oxide, and chromic oxide crystallites are contiguous they tend at high temperatures to convert to less active crystal forms and this is, as just noted, restrained and inhibited by the alumina of the support as shown.

With a given amount of manganese and chromium one can obtain a catalyst of maximum effectiveness by deploying the compound upon a surface as illustrated. Using larger amounts upon such a surface will not greatly increase catalytic activity.

The refractory is as illustrated preferably heteromorphic to the catalyst and so far as practicable to interspersants in the refractory. Among the refractory supports discussed, the following when having appropriate surfaces can advantageously be used:

(1) Bauxite
(2) Zirconia
(3) Titania
(4) Activated alumina

To obtain the effects described, the surface area ought to be at least 10 M.$^2$/g. with pore dimensions such that 40% are less than 200 Angstroms. Surface area and pore diameter are determined by standard methods used in catalyses and elsewhere. It is more preferred that the surface area be at least 80 M.$^2$/g. with pore dimensions of at least 60% less than 200 Angstroms.

The amount of catalyst to apply to such a refractory will depend upon the surface area of the particular refractory selected. Ordinarily the amount will run from about 2% for refractories of comparatively low surface area up to around 20% for refractories of high surface area. It will be evident that there is no great disadvantage to using too much catalyst except that it is wasteful because catalytic efficiency does not rise in proportion to the amount of catalyst used above a certain figure which can readily be determined for a particular catalyst and support.

Catalysts prepared and supported as just described are illustrated as in Example 3 where activated bauxite is the support. The bauxite as used in that example has a surface area of about 200 M.$^2$/g. and approximately 60% of the pores are under 200 Angstroms diameter.

It is to be noted that the life of catalytic aggregates of the invention can be extended by the inclusion of small amounts of an alkali or an alkaline earth. These have the effect of permitting the catalyst to regenerate itself in use through their functioning as a promoter for the re-oxidation of the manganese chromite to a higher state of oxidation. Thus, based on the weight of manganese chromite, there can be used between 0.05% and 10% of an alkali. The alkalis can include potassium, sodium, lithium, magnesium, calcium, strontium, and barium, hydroxides, oxides, or carbonates. The alkali can be added at any appropriate stage in manufacture or after the catalyst has been finished. Again, the alkali can be added to a catalytic support.

Instead of supporting the catalysts as just described, they can be compressed into tablets or pellets. This can be done with conventional pelleting and tableting machinery. A pelleting lubricant should be used, such as powdered graphite or stearic acid. Other conventional lubricants can be used, and the amounts are those normally employed, say 0.1 to 2%, the exact amount being determined in accordance with customary practice.

Devices according to the present invention are illustrated in the drawings. In FIGURE 1 there is shown an elongated catalyst chamber suitable in shape for mounting under an automobile chassis. It is provided with vertical baffles which require gases passing through the chamber to travel in a tortuous path and to make intimate contact with the body of the catalyst in the chamber. There is an inlet 2 for the exhaust gases and an exit 3.

In the first area of the muffler there is indicated at 4 a granular refractory which can be catalyst or can be uncoated refractory or ceramic which will serve as a filter to restrain the passage of particles of materials carried over the exhaust gases. Foraminous materials can similarly be used such as metal screen. In subsequent chambers there is a catalyst 5 which can be a chromite catalyst such as that of Examples 1 or 2 in the form of pellets as described but is preferably manganese chromite supported upon a refractory as in Example 3 and even more preferably containing a co-catalyst as in Example 4. At 6 there is shown an inlet for air which is provided by a compressor 7 driven by the automobile motor.

Figure 2:
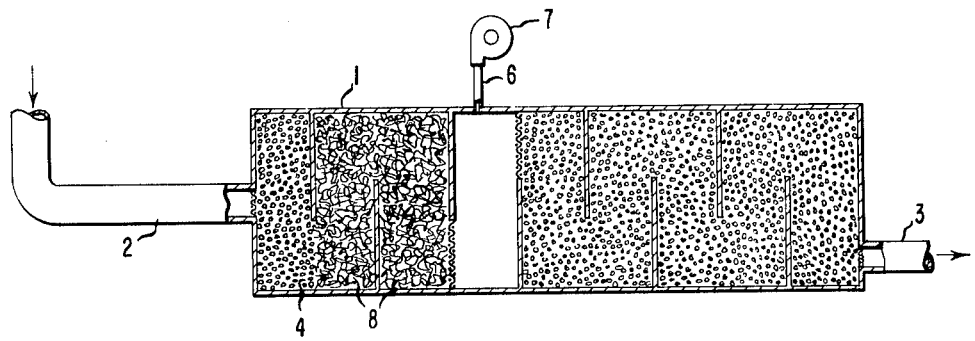
FIGURE 2 illustrates a modified embodiment of the invention.

FIGURE 2 illustrates a modified device in which the same reference numerals are applied to means corresponding to those shown in FIGURE 1. The entering exhaust gases are first reduced with a catalyst 8 which can be as shown at 5 in FIGURE 1. This can preferably be especially prepared to be resistant to high temperature and can be, for example, one of the catalysts above supported upon etched Inconel, Nichrome, or nickel, and is so shown in the drawing. Alternatively, of course, the refractory bodies can be any of those previously discussed.

At 6 is provided the air inlet but, as is evident, this passes into a mixing chamber and while the catalysts in the earlier chambers act as a reducing catalyst, the addition of air at this point causes the catalyst in subsequent areas to act as an oxidizing catalyst. A catalyst 8 is provided in the following chambers and this can be the same catalyst as the one at 5 or different.

It is to be noted that the air entering at 6 will serve to cool the gases which have been heated in the reducing catalytic reaction of the early chambers. Additional heat exchange capacity can be provided in the form of tubes or other conventional cooling means through the catalyst bed in the early chambers or even throughout the reactor to maintain temperatures at a desired level.

Figure 3:
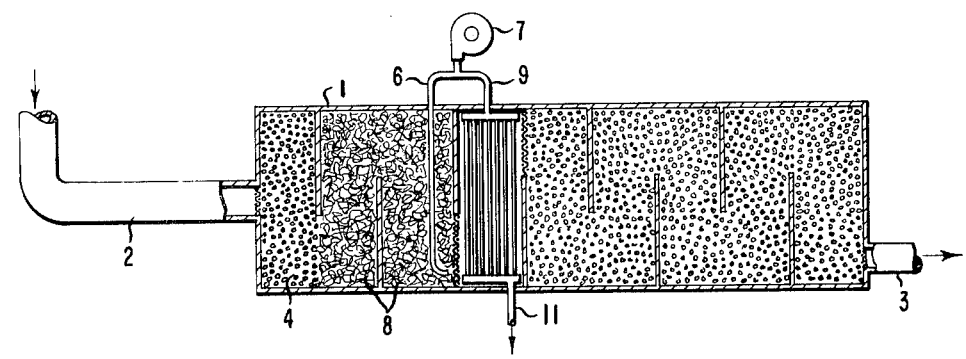
FIGURE 3 shows a still further modification employing indirect heat exchange for cooling gases within the catalytic muffler of the invention.

A typical heat exchange arrangement is illustrated in FIGURE 3 in which corresponding means are designated by the same reference numerals as in FIGURE 2. The airstream supplied by the compressor 7 is divided and a portion of the air passes through an inlet 9. A group of tubes serves as a heat exchanger 10. The air exits at 11 from the heat exchanger.

In order that the invention may be better understood, reference should be had to the following illustrative examples:

Example 1

(1) Dissolve 165 pounds, 3 pound moles, of manganese as the nitrate in 750 gallons of water. That is to say, manganese nitrate is used (containing 165 pounds Mn) in amounts of 3 pound moles.

(2) Dissolve also in the same solution containing the manganese nitrate 300 pounds, 3 pound moles, of chromic acid anhydride ($CrO_3$).

(3) Adjust the volume to 800 gallons and the temperature to 35° C.

(4) Agitate the solution vigorously while adding vaporized anhydrous ammonia through a diffusion sparger at a rate of two pounds per minute until the precipitation is complete. Further addition of ammonia produces no further precipitate.

(5) Agitate the slurry for one hour then filter in a plate and frame press. Wash the filter cake in situ to remove dissolved salts.

(6) Dry in thin layers at 125°–150° C. for 16 hours.

(7) After drying, calcine the catalyst at 400° C. for three hours after reaching this temperature. Manganese chromites thus prepared had a crystallite size of 50 angstroms or less. The Mn:Cr ratio of the product is 3:2.

(8) Knead a 100 pound lot with 65 pounds of water.

(9) Pulverize, mix with 1% of finely divided graphite and pill on a Stokes BB-2 rotary tableting machine.

(10) Heat the pellets thus obtained in thin layers in an oxidizing atmosphere at 400° C. for three hours. The catalyst pellets as thus prepared can be used in an automobile exhaust, either alone or with other catalysts, for abatement of the exhaust-fume problem.

Example 2

A catalyst is prepared as in Example 1 except that Steps 1 and 2 are modified as follows:

(1) Dissolve 110 pounds of manganese as the nitrate in 750 gallons of water.

(2) Dissolve in the same solution 30 pounds of nickel as nickel nitrate, 33 pounds of copper as copper nitrate, and 300 pounds of chromic acid anhydride.

Instead of copper and nickel, equivalent atomic values of other base metal catalysts can be used such as iron, zinc, cadmium, cobalt, tin, or bismuth and mixtures of these or a single one can be used to replace the copper or the nickel or both.

Example 3

(1) 300 parts by weight of chromic acid anhydride and 140 parts by weight of ammonia are dissolved in 610 parts by weight of water.

(2) A second solution is made containing 165 parts by weight of manganese as manganese nitrate and 923 parts by weight of water.

(3) 300 parts by weight of activated bauxite of 4 to 8 mesh granules is placed in a perforated basket and dipped into the solution prepared in item 1 above. It is then removed, drained for three minutes and then dipped into the solution described in item 2 above. After remaining in the solution for about one minute the basket is removed and the bauxite is drained and dried. It is noted that the activated bauxite is an article of commerce prepared by heating bauxite ore under oxidizing conditions. It has a nitrogen surface area of about 200 $M.^2/g.$ and 50–60% of the pores are under 200 angstroms.

(4) The dry granules are then heated to 250° C. for 30 minutes. They are then cooled. The catalyst thus prepared has a ratio Mn:Cr of 3:3. It is to be noted that the Mn:Cr ratio is that of the reactants used because unlike aqueous precipitations there is no loss of chromium during the processing.

The catalyst thus prepared can be used for reduction and the oxidation of components of automobile exhaust gases as herein described.

Example 4

(1) 300 parts by weight of chromic acid anhydride and 140 parts by weight of ammonia ($NH_3$) are dissolved in 610 parts by weight of water.

(2) A second solution is made containing 110 parts by weight of manganese as manganese nitrate, 30 parts by weight of nickel as nickel nitrate, 32 parts by weight of copper as copper nitrate, and 923 parts by weight of water.

(3) Five hundred parts by weight of 1/8" by 1/8" cylinders of processed diatomaceous earth is placed in a perforated basket and dipped into the first solution, drained, and then dipped into the second. The product is dried.

(4) The dried granules are heated to 200° C. for 30 minutes and then allowed to cool. The catalyst thus prepared has an Mn:Cr ratio of 3:3. The catalyst is useful for treatment of automobile exhaust gases.

Instead of the carrier shown, there can be used any of those listed above such as Alundum, pumice, etched Nichrome, ceramic spheres and rings, etc. The weight of the carrier in each instance being that shown in this example.

Example 5

Catalysts are prepared as in Example 4 except that the catalyst support used is activated bauxite of 4 to 8 mesh granules which have previously been treated with a concentrated calcium hydroxide solution to supply about 2½% of calcium oxide based upon the weight of bauxite. The bauxite is dried following the alkali treatment at 150° C. Instead of calcium hydroxide, an equal weight of potassium, sodium, lithium, magnesium, strontium, and barium hydroxide, oxides, or carbonate can be used.

It is noted that the treatment with alkali can instead be conducted just as described but after the support has been coated with the catalyst and dried.

What we claim is:

1. A process for treatment of automobile exhaust gases comprising passing said gases over manganese chromite having a Mn:Cr atomic ratio of 3:2 to 3:3, said manganese chromite having been prepared by reaction in aqueous solution of a divalent manganese salt and a hexavalent chromium compound in the presence of a precipitant selected from the group consisting of ammonia, ammonium hydroxide, ammonium chromate and ammoniacal ammonium chromate.

2. A process for treatment of automobile exhaust gases comprising passing said gases over manganese chromite having an Mn:Cr atomic ratio of 3:2 to 3:3 which contains a chromite of a metal selected from the group consisting of copper, nickel, iron, zinc, cadmium, cobalt, tin and bismuth, said manganese chromite having been prepared by reaction in aqueous solution of a divalent manganese salt and a hexavalent chromium compound in the present of a precipitant selected from the group consisting of ammonia, ammonium hydroxide, ammonium chromate, and ammoniacal ammonium chromate.

3. A process for treatment of automobile exhaust gases comprising adding air to said gases and passing the mixture over manganese chromite having a Mn:Cr atomic ratio of 3:2 to 3:3, said manganese chromite having been prepared by reaction in aqueous solution of a divalent manganese salt and a hexavalent chromium compound in the presence of a precipitant selected from the group consisting of ammonia, ammonium hydroxide, ammonium chromate and ammoniacal ammonium chromate.

4. A process for treatment of automobile exhaust gases comprising passing said gases over manganese chromite to reduce nitrogen oxides, adding air to the treated gas stream, and passing the mixture over manganese chromite to oxidize carbon monoxide and hydrocarbons, said manganese chromites having a Mn:Cr atomic ratio of 3:2 to 3:3 and having been prepared by reaction in aqueous solution of a divalent manganese salt and a hexavalent chromium compound in the presence of a precipitant selected from the group consisting of ammonia, ammonium hydroxide, ammonium chromate and ammoniacal ammonium chromate.

References Cited by the Examiner

UNITED STATES PATENTS

| | | | |
|---|---|---|---|
| 1,789,812 | 1/1931 | Frazier | 23—2.2 |
| 1,902,160 | 3/1933 | Frazier et al. | 23—2.2 |
| 1,934,795 | 11/1933 | Frazier | 23—2.2 |
| 1,977,978 | 10/1934 | Wenzel | 23—22 |
| 1,995,353 | 3/1935 | Jenness | 252—471 |
| 2,025,140 | 12/1935 | Wenzel | 23—2 |
| 2,108,156 | 2/1938 | Wortz | 260—595 |
| 2,418,888 | 4/1947 | Kearby | 252—473 |
| 2,867,497 | 1/1959 | Houdry | 23—2 |

OTHER REFERENCES

Mellor: "A Comprehensive Treatise on Inorganic and Theoretical Chemistry," Longmans, Green & Co., New York, N.Y., volume 12, 1932, page 280.

Mellor: "Comprehensive Treatise on Inorganic and Theoretical Chemistry," Longmans, Green & Co., New York, N.Y., volume 11, 1931, page 308.

MAURICE A. BRINDISI, *Primary Examiner.*

JULIUS GREENWALD, *Examiner.*